May 22, 1962 M. F. HAMER ET AL 3,035,806
RADIO HOLD-DOWN DEVICE
Filed July 27, 1959 2 Sheets-Sheet 1
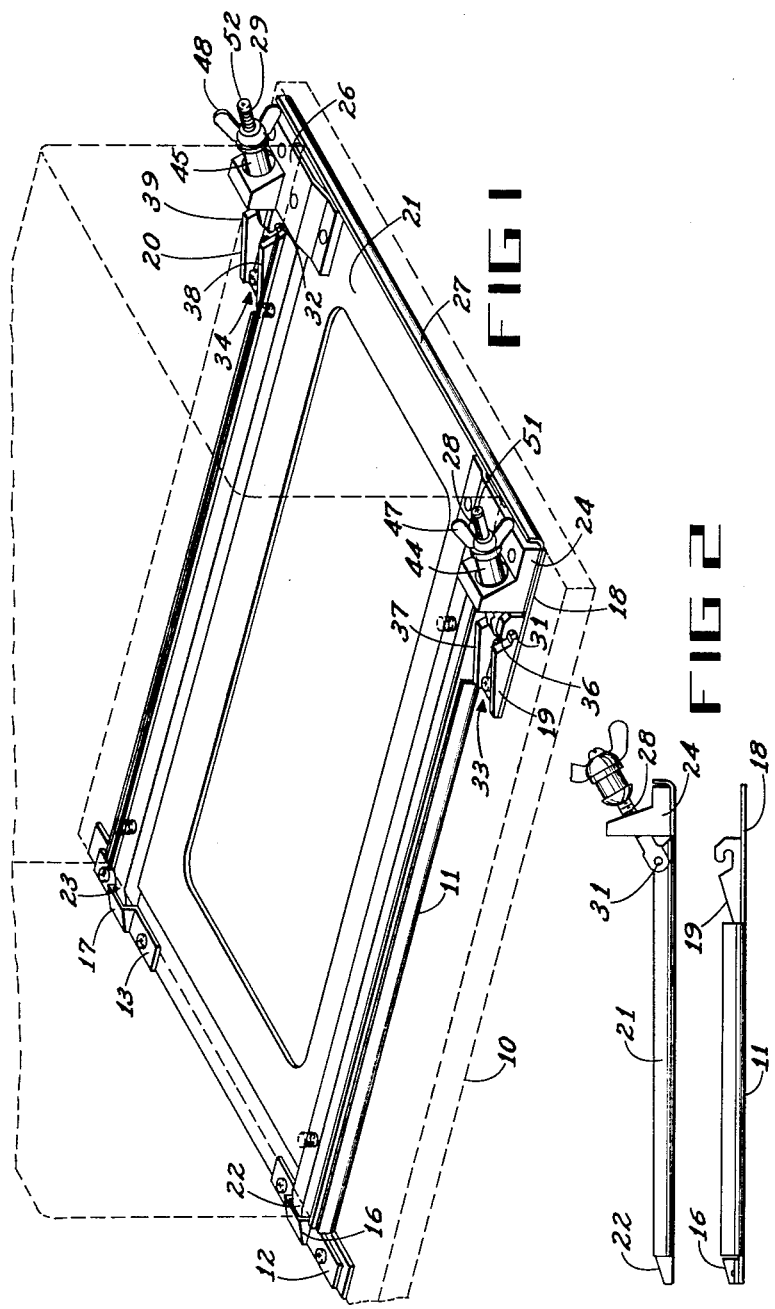
INVENTORS
MORGAN F. HAMER
DONALD E. LIVINGSTON
BY
ATTORNEY

United States Patent Office 3,035,806
Patented May 22, 1962

3,035,806
RADIO HOLD-DOWN DEVICE
Morgan F. Hamer and Donald E. Livingston, Cedar Rapids, Iowa, assignors to Collins Radio Company, Cedar Rapids, Iowa, a corporation of Iowa
Filed July 27, 1959, Ser. No. 829,923
3 Claims. (Cl. 248—361)

This invention relates in general to holding means and in particular to apparatus for attaching a container such as a radio case or other apparatus to a base plate.

It is quite often necessary to remove the radio gear so that it can be replaced or repaired. Also, in aircraft and other mobile craft it is necessary that the radios be firmly attached to the frame of the craft so that they do not come loose during flight.

It is an object of this invention, therefore, to provide a simple yet positive hold-down device for attaching a first member to a second member.

Yet another object is to provide a positive hold-down device which fastens two members together at four points but which requires that only a portion of the clamping devices be loosened to disconnect the members.

A feature of this invention is found in the provision for a pair of bayonet pins on a first member that are receivable into receptacles on a second member and a pair of ball and socket clamps on the first member which are detachably connectable to hooks on the second member.

Further objects, features, and advantages of the invention will become apparent from the following description and claims when read in view of the accompanying drawings, in which:

FIGURE 1 illustrates in perspective the attaching mechanism of this invention;

FIGURE 2 is a side view showing the members separated;

Figure 3:
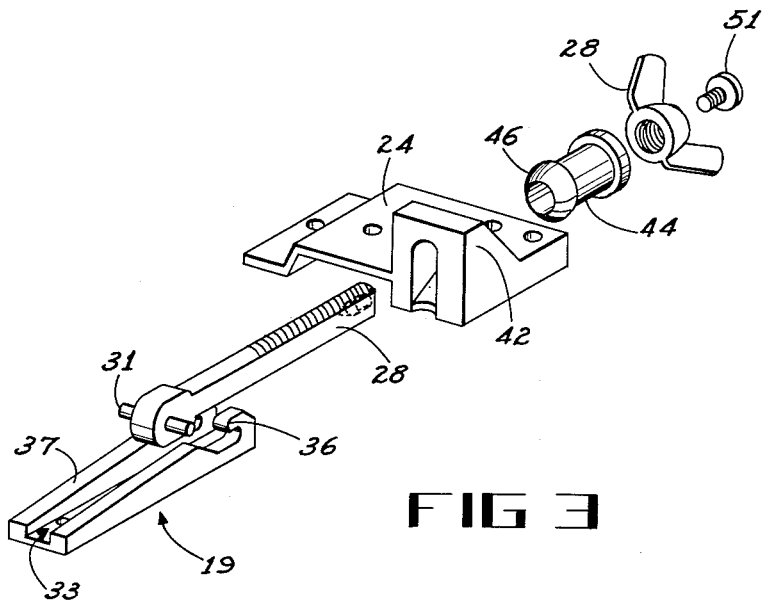
FIGURE 3 is an exploded view of the ball and socket clamp.
Figure 4:
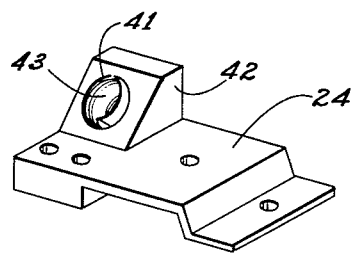
FIGURE 4 is a detailed perspective view of the socket member.

Referring to the drawings, FIGURE 1 shows a base plate 10 to which is attached a supporting bracket 11. A pair of brackets 12 and 13 are attached to member 11 adjacent the rear edge and are formed with receptacles 16 and 17.

A pair of brackets 18 are attached to the member 11 adjacent the forward corners and carry hook-shaped members 19 and 20.

A locking plate 21 is attached to the bottom of the removable member and has a pair of bayonet pins 22 and 23 at its rearward edge which are receivable in receptacles 16 and 17. A pair of ball and socket brackets 24 and 26 are mounted adjacent the forward edge 27 of plate 21.

Threaded shafts 28 and 29 are receivable through each of the ball and socket brackets 24 and 26. Transverse pins 31 and 32 are attached to the lower ends of shafts 28 and 29 and are engageable with hooks 19 and 20. Hooks 19 and 20 have channels 33 and 34 formed therethrough and have dual hook portions 36 and 37, and 38 and 39, respectively. Shafts 28 and 29 have their opposite sides flattened. Brackets 24 and 26 are formed with race-track shaped openings 41 through which shafts 28 and 29 extend. The flattened sides of shafts 28 and 29 prevent them from rotating in openings 41 and assure proper alignment of the transverse pins 31 and 32.

The members 24 and 26 have upwardly-extending portions 42 which are formed with ball-shaped sockets 43. Sleeves 44 and 45 have lower portions 46 formed into hemispherical shapes and are receivable in sockets 43. Sleeves 44 are formed with central openings through which the shafts 28 and 29 extend and winged nuts 47 and 48 are threadedly received on shafts 28 and 29. The outer ends of shafts 28 and 29 are internally threaded to receive set screws 51 and 52 for limiting the rotation of the winged nut relative to the threaded shaft.

As best shown in FIGURE 1, members 11 and 21 are attached by inserting the bayonet pins 22 and 23 into the receptacles 16 and 17 and by loosening the winged nuts 47 and 48 and connecting the transverse pins 31 and 32 under hooks 19 and 20. Then the winged nuts 47 and 48 are tightened so as to firmly pull the front portions of the members 11 and 21 together and to urge bayonet pins 22 and 23 firmly into the receptacles 16 and 17. Thus, a positive connection is made between the two members.

It is to be noted that the ball and socket brackets 24 and 26 are formed such that the transverse pins 31 and 32 pull downwardly and rearwardly on the upper member 21. Sleeves 44 and 45 are self-seating and will assume a position to distribute the bearing force.

It is seen that this invention provides means for quickly locking and unlocking a pair of members. In operation the operator may disconnect and remove the upper member from the lower member by merely loosening the winged nuts 47 and 48 and then removing the transverse pins 31 and 32 from behind the hooks 19 and 20. Then the upper member may be lifted upwardly and outwardly away from the lower member. To re-attach the two members the operator inserts the bayonet pins 22 and 23 into the receptacles 16 and 17 and inserts transverse pins 31 and 32 into hooks 19 and 20 and tightens winged nuts 47 and 48 until the members are firmly locked together. The transverse pins 31 and 32 may be easily placed behind the hooks by feel.

Although this invention has been described with respect to a preferred embodiment, it is not to be so limited, as changes and modifications may be made therein which are within the full intended scope of the invention as defined by the appended claims.

We claim:

1. Means for attaching a pair of members together, comprising a pair of receptacles formed adjacent one edge of the first one of said members, a pair of bayonet pins attached to the second member and engageable with the receptacles on the first member, a pair of hook means mounted on the first member adjacent corners opposite the receptacles, a pair of ball and socket connecting means attached to the second member on the side opposite the bayonet pins and engageable with the hook means to lock the first and second members together, said hook means comprising a pair of double hooks with a channel formed in each of them and wherein each of said ball and socket connecting means comprises a shaft with a transverse pin attached to its lower end for engaging a double hook, a pair of blocks formed with slots having substantially parallel sides between which the threaded shafts extend, and winged nuts receivable on the outer ends of said shafts.

2. Apparatus according to claim 1 wherein each of the threaded shafts are formed with flattened sides spaced for slidable engagement with said slot sides so as to allow the threaded shafts to move relative to the blocks but not to rotate relative thereto.

3. Apparatus according to claim 2 wherein a ball and socket connection is formed between the shaft and the block by means including a socket formed in the block adjacent said slot, a sleeve receivable over the threaded shaft and formed with a lower edge which is hemispherically shaped and engageable with said socket, and the winged nut threadedly received on the shaft engageable against the sleeve so as to lock the two members together.

References Cited in the file of this patent

UNITED STATES PATENTS

| | | |
|---|---|---|
| 1,977,431 | Des Isles | Oct. 16, 1934 |
| 2,798,635 | Elkind | July 9, 1957 |
| 2,833,363 | Henehan | May 6, 1958 |
| 2,860,716 | Flock | Nov. 18, 1958 |
| 2,904,287 | Ertsgaard et al. | Sept. 15, 1959 |